US012577180B2

(12) United States Patent
Heebner et al.

(10) Patent No.: US 12,577,180 B2
(45) Date of Patent: Mar. 17, 2026

(54) FERTILIZER COATING COMPOSITIONS AND METHODS OF PREPARATION THEREOF

(71) Applicant: Kraton Chemical, LLC, Jacksonville, FL (US)

(72) Inventors: Gerald Heebner, Savannah, GA (US); Lloyd Nelson, Savannah, GA (US)

(73) Assignee: Kraton Chemical LLC, Jacksonville, FL (US)

( * ) Notice: Subject to any disclaimer, the term of this patent is extended or adjusted under 35 U.S.C. 154(b) by 791 days.

(21) Appl. No.: 17/930,517

(22) Filed: Sep. 8, 2022

(65) Prior Publication Data

US 2023/0083455 A1 Mar. 16, 2023

Related U.S. Application Data

(60) Provisional application No. 63/260,994, filed on Sep. 8, 2021.

(51) Int. Cl.
| | |
|---|---|
| *C05G 3/20* | (2020.01) |
| *C05B 7/00* | (2006.01) |
| *C05C 3/00* | (2006.01) |
| *C05G 5/30* | (2020.01) |

(52) U.S. Cl.
CPC .................. *C05G 3/20* (2020.02); *C05B 7/00* (2013.01); *C05C 3/00* (2013.01); *C05G 5/38* (2020.02)

(58) Field of Classification Search
CPC .... C05G 3/20; C05G 5/38; C05B 7/00; C05C 3/00
See application file for complete search history.

(56) References Cited

U.S. PATENT DOCUMENTS

| | | | | |
|---|---|---|---|---|
| 3,252,786 A | * | 5/1966 | Bozzelli ................... | C05B 1/04 252/384 |
| 2017/0204019 A1 | * | 7/2017 | Ogzewalla ............... | C05G 3/30 |

* cited by examiner

*Primary Examiner* — Amber R Orlando
*Assistant Examiner* — Heather Elise Rainbow
(74) *Attorney, Agent, or Firm* — Beth Haslam

(57) ABSTRACT

The disclosure relates to fertilizer coating compositions and methods for making thereof. The fertilizer coating comprises a decarboxylated rosin acid (DCR) component, optional bitumen and other additives. The DCR has a Kb value of 25-90, a density of 0.9 to 1.0 g/cm³ at 20° C., an aniline point of 3-40° C., and an acid value of <50 mg KOH/g. The fertilizer coated with the coating composition has a reduction in dust level of >25% after 2 weeks of aging compared to a fertilizer not having the coating composition disposed thereon, according to Dust Level Measurement Test.

17 Claims, No Drawings

FERTILIZER COATING COMPOSITIONS AND METHODS OF PREPARATION THEREOF

RELATED APPLICATIONS

This application claims priority from U.S. Provisional Application No. 63/260,994 with a filing date of Sep. 8, 2021, the disclosure of which is incorporated herein by reference.

FIELD

The disclosure relates to a biobased fertilizer coating composition and methods of preparation.

BACKGROUND

The storage and handling of bulk materials present unique problems relating to both dust formation and cake formation. Specifically, dust formation causes processing issues, while cake formation makes storing and handling of bulk materials difficult. These issues are often experienced in the fertilizer industry. Fertilizers are generally in powder, crystalline, or granular form and have a tendency to generate dust during manufacture, storage, and transportation. Dust may be formed due to abrasion encountered during movement of the fertilizer particles, continued chemical reactions, or curing processes after the initial particle formation. Fertilizer particles also tend to cake or agglomerate into larger lumps due to changes in humidity and/or temperature or other environmental conditions. Cake formation can pose a problem prior to the application of the fertilizer because the fertilizer must be distributed or spread evenly onto the field and not clog distribution/spreading machinery.

It is desirable to provide a coating formulation for fertilizer, particularly a biobased formulation, to reduce the generation of dust and reduce the tendency of fertilizer to cake during storage and handling conditions.

SUMMARY

In one aspect, the disclosure relates to a fertilizer composite comprising a fertilizer substrate, and a coating disposed on at least a surface of the fertilizer substrate. The coating comprises up to 100% decarboxylated rosin acid (DCR). The DCR has a Kb value of 25-90, according to ASTM D1133, an aniline point of 3-40° C., according to ASTM D611, a viscosity of 15 to 60 cSt at 40° C., measured according to ASTM D-445; and an acid value of <50 mg KOH/g, as measured using ASTM D1240-14 (2018). The fertilizer composite has a reduction in dust level of >25% after 2 weeks of aging compared to a fertilizer substrate not having the coating disposed thereon.

In another aspect, the DCR comprises: one or more C═C groups; and 40 to 100 wt. % of tricyclic compounds having 18 to 20 carbon atoms, based on the total weight of the DCR.

In another aspect, the sum of tricyclic compounds as aromatic and cycloaliphatic in the DCR is >50 wt. %, based on total weight of the DCR.

In another aspect, the amount of the tricyclic cycloaliphatic compounds in the DCR is >15 wt. %, based on total weight of the DCR.

In another aspect, the DCR has an aromatic content of 30-60 wt. %, a naphthenic content of 40-60 wt. %, and a paraffinic content of 20-35 wt. %, based on the total weight of the DCR.

In yet another aspect, a method of making a fertilizer composite is disclosed. The method comprises providing a fertilizer substrate and contacting the fertilizer substrate with a coating. The coating comprises up to 100% decarboxylated rosin acid (DCR). The DCR has a Kb value of 25-90, according to ASTM D1133, an aniline point of 3-40° C., according to ASTM D611, a viscosity of 15 to 60 cSt at 40° C., measured according to ASTM D-445; and an acid value of <50 mg KOH/g, as measured using ASTM D1240-14 (2018). The fertilizer composite has a reduction in dust level of >25% after 2 weeks of aging compared to a fertilizer substrate not having the coating disposed thereon.

DESCRIPTION

The following terms will be used throughout the specification with the following meanings unless specified otherwise.

"At least one of [a group such as A, B, and C]" or "any of [a group such as A, B, and C]," or "selected from [A, B, and C]," means a single member from the group, more than one member from the group, or a combination of members from the group. For example, at least one of A, B, and C includes, for example, A only, B only, or C only, as well as A and B, A and C, B and C; or A, B, and C, or any other all combinations of A, B, and C. In another example, at least one of A and B means A only, B only, as well as A and B.

A list of embodiments presented as "A, B, or C" is to be interpreted as including the embodiments, A only, B only, C only, "A or B," "A or C," "B or C," or "A, B, or C."

"Fertilizer substrate" refers to a fertilizer to be coated, which can be in various forms.

The disclosure relates to a coating composition for fertilizer, comprising a decarboxylated rosin acid, optionally bitumen and/or other component(s).

Decarboxylated Rosin Acid (DCR): The DCR is a rosin-derived composition obtained by decarboxylating a rosin acid, or by dimerizing and decarboxylating a rosin acid and separating/removing the dimerized species. The DCR is in the form of a liquid, and can be any of a crude DCR, a distilled or purified DCR, or mixtures thereof. The DCR can be hydrogenated and/or functionalized. Crude DCR is DCR containing 5-25 wt. % of higher molecular weight (450-1500 Da) components, e.g., hydrocarbons, oligomers, polymers, impurities, or dimer/trimer of fatty acids. Distilled or purified DCR refers to crude DCR having heavy fractions removed to improve color, reduce sulfur, etc.

DCR is produced by the decomposition of rosin acids at high temperatures, e.g., 220-300° C. Rosin acids are normally solid, having a softening point of, e.g., 65-85° C. The rosin acid can be fully decarboxylated forming DCR. The rosin acid can be partially decarboxylated, forming DCR, which is a mixture of molecules, some of which contain monocarboxylic acids having a general molecular formula, e.g., $C_{20}H_{30}O_2$.

In embodiments, the DCR comprises one or more C═C groups, 40-100 wt. % of tricyclic compounds having 18-20 carbon atoms, 0-30 wt. % of components with <19 carbon atoms, and 40-100 wt. % of components with a molecular formula in the range from $C_{19}H_{20}$ to $C_{19}H_{34}$, based on the total weight of the DCR.

In embodiments, the DCR is characterized as having a m/z (mass/charge) value in the range of 220-280, or 230-270, or 234-262, or 235-265, or >230, or <265, measured by GC-FID-MS.

In embodiments, the DCR is characterized as having an oxygen content of <5%, or <3%, or <2%, or 0-1%. The oxygen content (in %) can be calculated as oxygen to carbon ratio, or the sum of oxygen atoms present divided by sum of carbon atoms present, with the number of oxygen and carbon atoms being obtained from elemental analyses.

In embodiments, sum of tricyclic compounds as aromatic and cycloaliphatic in the DCR is >50 wt. %, or >55 wt. %, or >60 wt. %, or >74 wt. %, or >90 wt. %, or up to 100 wt. %, of total weight of the DCR. Aromatic DCR is defined as DCR species having a MW of 252-256, with MW of 254 as having a reactive double bond, and cycloaliphatic DCR is defined as DCR species having a MW of 260 or 262.

In embodiments, the amount of cycloaliphatic DCR is >15 wt. %, or >20 wt. %, or >30 wt. %, or >40 wt. %, or >50 wt. %, or >80 wt. %, based on the total weight of the DCR.

In embodiments, total amount of tricyclic compounds having reactive double bond (C=C group) is 1-45 wt. %, or <40 wt. %, or <30 wt. %, or <20 wt. %, or <15 wt. %, or <10 wt. % of total weight of the DCR. Reactive C=C group is defined as DCR species having a MW of 254 or 258.

In embodiments, the DCR is characterized as having a lower acid value (carboxylic acid content) than the rosin acid feedstock for making the DCR. In embodiments, the DCR has an acid value of <50, or <45, or <40, or <35, or <30, or <25, or <20, or <15, or <10, or <7, or <5, or 0.5-40, or 0.5-30, or 0.5-20, or 1-20, or 1-15, or 1-15, or 1-10 mg/KOH, as measured using ASTM D1240-14 (2018) or ASTM D465.

In embodiments, the DCR has a density of 0.9-1.0, or 0.91-0.99, or 0.92-0.98, or 0.93-0.97, or 0.94-0.96, or >0.9, or <1.1 g/cm$^3$.

In embodiments, the DCR is characterized as having viscosities comparable to those of petrochemical base oils, due in part to its relatively high molecular weights, for example, a viscosity of 15-60, or 18-55, or 20-50, or 22-48, or 25-45, or 28-42, or 30-40, or >20, or >25, or >28, or <45, or <50 cSt according to ASTM D-445, measured at 40° C.

In embodiments, the DCR has an aniline point of 3-40° C., or 5-40° C., or 5-30° C., or 5-25° C., or 2-20° C., or 5-20° C., or 5-15° C., or <25° C., or <20° C., or >3° C., or >5° C., or >8° C., according to ASTM D611.

In embodiments, the DCR has a pour point of −40 to +10° C., or −35 to +8° C., −30 to +5° C., or −30 to +0° C., or −30 to −5° C., or −28 to 0° C., or −28 to −5° C., or −28 to −10° C., or >−30° C., or >−28° C., or <+5° C., according to ASTM D97.

In embodiments, the DCR has a flash point of 135-175° C., or 135-165° C., or 135-160° C., or 140-175° C., or 140-160° C., or 140-158° C., or 140-155° C., or >135° C., or >140° C., or <175° C., or <165° C., or <160° C., according to ASTM D92.

In embodiments, the DCR has a boiling point of 200-390° C., or 210-390° C., or 235-390° C., or 280-380° C., or 290-370° C., or 300-360° C., or >290° C., or >230° C., or >210° C., or <400° C., or <370° C., measured according to D2887.

In embodiments, the DCR has a Gardner Color of 0-12.0, or 0.5-12.0, or 0.8-12.0, or 0.9-11, or 1.0-10.0, or 1.0-6.0, or 1.0-5, or >0, or >1.0, or >1.2, or <10.0, or <7.0, or <6.0, or <5.0, or <2.4, or <3.0, according to ASTM D6166.

In embodiments, the DCR has a sulfur content of <500 ppm (0.05 wt. %), or <300 ppm (0.03 wt. %), or <200 ppm (0.02 wt. %), or <100 ppm (0.01 wt. %), or <10 ppm (0.001 wt. %), or 20-700 ppm (0.002-0.7 wt. %), 30-500 ppm (0.003-0.5 wt. %), or 40-400 ppm (0.004-0.4 wt. %), or 40-300 ppm (0.004-0.3 wt. %), or 40-200 ppm (0.004-0.2 wt. %), based on total weight of the DCR, measured according to ASTM D5453.

In embodiments, the DCR has a VOC of <5, or <4.75, or <4.5, or <4.25, or <4.0, or <3.75, or <3.5, or <3.25, or <3.0, or <2.75, or <2.5, or <2.25, or <2.0, or <1.5, or <1.0, or <0.5 wt. %, based on total weight of the DCR. The VOC of the DCR is measured according to methods: i) summing the percent by weight contribution from all VOCs present in the product at 0.01% or more, or ii) according to the EPA (Environmental Protection Agency) method 24 or equivalent.

In embodiments, the DCR has a Kb (Kauri butanol) value of 25-90, or 30-85, or 35-80, or 40-75, or 45-70, or 50-65, or >40, or >50, or >60, or >70, or >80, according to ASTM D1133.

In embodiments, the DCR has a viscosity index of <−100, or <−110, or <−115, or <−120, measured according to ASTM D2270. The viscosity index is an arbitrary, unit-less measure of a fluid's change in viscosity relative to temperature change, for example, index of viscosity at 40° C. and viscosity at 100° C.

In embodiments, the DCR has a δD value of 14-18, or 14.2-17.8, or 14.5-17.5, or 15-17, or 15.2-16.5; a δP value of 3-6, or 3.2-5.5, or 3.4-5.2, or 3.5-5.0; and 6H value of 7-10, or 7.5-9.5, or 8-9, or 8.2-8.8.

In embodiments, the DCR has a surface tension of 25-50, or 28-45, or 30-40 dynes/cm, according to ASTM D1331.

In embodiments, the fertilizer coating composition consists essentially of DCR, e.g., up to 100 wt. %. In other embodiments, the fertilizer coating composition comprises DCR in amounts of 2-99 wt. %, or 4-98 wt. %, or 5-95 wt. %, or 10-90 wt. %, or 15-75 wt. %, or 20-60 wt. %, or <50 wt. %, >2 wt. %, based on the total weight of the fertilizer coating composition.

Bitumen Component: In embodiments, the fertilizer coating composition further comprises bitumen as a binder. The bitumen may be bitumen, cutback bitumen, or a combination or bitumen and cutback bitumen, for 50-100% bitumen and 0-50% cutback diluent in embodiments. The bitumen, cutback bitumen, or combination of bitumen and cutback bitumen can be first emulsified with water.

In embodiments, the bitumen is present in an amount of up to 1-98 wt. %, or 5-95 wt. %, or 10-90 wt. %, or 25-85 wt. %, or 40-80 wt. %, or 30-70 wt. %, or 40-60 wt. %, or 70-95 wt. %, or >0 wt. %, or <95 wt. %, or <85 wt. %, or <75 wt. %, or <50 wt. %, or <40 wt. %, by weight of the total weight of the fertilizer coating composition.

Optional Components: In embodiments, the fertilizer coating composition can further comprise any of waxes, resins/polymers, plant oils, and mixtures thereof, in addition to or in place of bitumen. These components can be combined with the DCR and other components prior to application to the fertilizer substrate or applied to the fertilizer substrate as a coating layer by itself.

The wax can be a petroleum wax, such as paraffin wax, microcrystalline wax, petrolatum, etc., bees wax and Japan wax.

The resins/polymers can include, but are not limited to, polyethylene, polypropylene, polystyrene, polymethyl (meth)acrylate (the letters in the parentheses may or may not be read hereinafter), ethylene-(meth)acrylic acid copolymer, ethylene-(meth)acrylate copolymer, ethylenecarbon monoxide copolymer, polyvinyl chloride, polyvinylidene chloride, vinyl chloride-vinylidene chloride copolymer, and diene (co)polymers such as polybutadiene, polyisoprene, polychloroprene, butadiene-styrene copolymer, EPDM, and styrene-isoprene copolymer. In addition, there may be used natural resins such as petroleum resin, natural rubber, and rosin, fats and oils such as hardened oil and solid fatty acid, and modified products thereof.

The plants oils can include unsaturated fatty acids such as oleic acid, linolic acid, linolenic acid, arachidonic acid, erucic acid, palmitoleic acid, ricinoleic acid, and eleostearic acid, unsaturated fatty acid esters such as methyl esters, ethyl esters, propyl esters, and isobutyl esters of oleic acid, linolic acid, linolenic acid, arachidonic acid, erucic acid, palmitoleic acid, ricinoleic acid, and eleostearic acid, fats and oils, e.g., vegetable oils such as linseed oil, soybean oil, tung oil, rapeseed oil, cotton seed oil, olive oil, tsubaki oil, and castor oil, and animal oils such as whale oil, beef tallow, fish oil, and liver oil, and others.

The fertilizer coating composition can further include any of fillers, surface active agents, photodegradation/oxidative degradation accelerators, colorants, adhesion promoters, adjuvants, other additives and mixtures thereof.

Surface active agents can be anionic surface active agents, nonionic surface active agents, cationic surface active agents, and amphoteric surface active agents.

Examples of photodegradation/oxidative degradation accelerators can be organometallic complexes containing at least one metal selected from the group consisting of iron, cobalt, nickel, copper, manganese, silver, palladium, molybdenum, chromium, tungsten, and cerium.

The optional additives can be present in amounts up to 1-98 wt. %, or 5-95 wt. %, or 10-90 wt. %, or 25-85 wt. %, or 40-80 wt. %, or 30-70 wt. %, or 40-60 wt. %, or 70-95 wt. %, or >0 wt. %, or <95 wt. %, or <85 wt. %, or <75 wt. %, or <50 wt. %, or <40 wt. %, based on the total weight of the fertilizer coating composition.

Fertilizer Substrate: The fertilizer substrate to be coated is not limited, and any conventionally known fertilizer can be used. The fertilizer substrate can comprise nitrogen, phosphorus, or potassium sources such as ammonium nitrate, ammonium sulfate, ammonium sulfate nitrate, calcium nitrate, calcium ammonium nitrate, magnesia ammonium nitrate, ammonium chloride, urea, urea-formaldehyde, monoammonium phosphate (MAP), ammonium phosphate, diammonium phosphate, polyphosphate compounds, phosphate rock, single superphosphate (SSP), triple super phosphate, potassium nitrate, sodium nitrate, lime nitrogen, formaldehyde-processed urea (UF) acetaldehyde-processed urea (CDU), isobutyl aldehyde-processed urea (IBDU), and guanylurea (GU); phosphatic fertilizers such as superphosphate of lime, double superphosphate of lime, fused phosphate, humic acid phosphate, calcined phosphate, multiphosphate, magnesia superphosphate, ammonium polyphosphate, potassium metaphosphate, calcium metaphosphate, magnesia phosphate, ammonium sulfate phosphate, potassium ammonium nitrate phosphate, and ammonium chloride phosphate; and potassic fertilizer components such as potassium chloride, potassium sulfate, potash soda sulfate, potash magnesia sulfate, potassium bicarbonate, and potassium phosphate. The fertilizer may be used alone, or two or more kinds of fertilizer may be combined.

In embodiments, nutrients such as magnesium sulfate and a source of one or more trace elements, i.e., micronutrients can be included, for example boron, calcium, chlorine, cobalt, copper, iron, manganese, molybdenum, nickel, sodium, zinc, or a combination comprising at least one of the foregoing can be present. These nutrients may be supplied in elemental form or in the form of salts, for example as sulfates, nitrates, or halides.

The fertilizer substrate can be a granular material obtained by granulating a fertilizer component alone, or a granular material including a fertilizer component and a carrier for holding the fertilizer component. Examples of carrier include mineral matters such as kaolin minerals such as kaolinite, montmorillonite, smectite, talc, agalmatolite, silica, zeolite, and acid clay; plant matter such as cellulose, chaff, starch, and soybean powder; and water-soluble materials such as lactose, sucrose, dextrin, table salt, sodium tripolyphosphate, and combinations thereof.

In embodiments, the fertilizer substrate includes other components such as fillers, surfactants, nucleation agents, or recycled fertilizer particles, which can act as a source of nucleating agents, nucleating soil conditioners such as calcium carbonate, activated carbon, elemental sulfur, biocides such as pesticides, herbicides, or fungicides, wicking agents, wetting agents, heat stabilizers, adhesives such as cellulose, polyvinyl alcohols, fats, oils, gum arabics, vinylidene ultraviolet stabilizers, antioxidants, reducing agents, colorants, binders (i.e., organochlorides, zeins, gelatins, chitosan, polyethylene oxide polymers, and acrylamide polymers and copolymers), and the like, and combinations thereof.

The fertilizer substrate can be in any of the form, e.g., granular, pelletized, crushed, compacted, crystalline, agglomerated, or prilled form. The particle size depends on the form of the fertilizer substrate and is not particularly limited, selected as appropriate according to the end-use application. For example, the average particle size of the fertilizer substrate can be any of 0.1-15 mm, or 1-10 mm, or >2 mm, or <5 mm. The shape is also not limited and can be selected according to fertilizer type and end-use applications, e.g., spherical, polyhedral, cylindrical, or irregular shape.

Depending on the fertilizer substrate used, e.g., pellets, granules, powder, etc., the amount of coating to fertilizer substrate ranges from 0.1:1000 to 5:10, or 0.3:1000 to 4:10, or 0.5:1000 to 3:10, or 1:1000 to 2:1, or >0.1:1000, or >0.5:1000, or <5:10, or <4:10.

Methods of Making Coating Composition: The coating composition can consist essentially of DCR; or can comprise DCR with other components such as bitumen and/or optional additives. In embodiments, the components are mixed or blended together. The mixing/blending temperature depends on the components present in the coating composition and can range from ambient temperature (for coating compositions consisting essentially of DCR as a liquid) to up to 200° C. (for coating compositions comprising bitumen as main component). Ambient temperature can be any of 0.5° C.-49° C., or 10° C.-40° C.

Methods for Coating Fertilizer: The coating composition can be used to coat fertilizer by any of spraying, drum coating, pan coating, fluid bed coating, continuous pour coating, or any other known method, via batch or continuous process as a single coating or as multiple coatings/layers. In embodiments, the fertilizer substrate can be pre-treated to improve mechanical properties, e.g., smoothing the surface, before the coating composition is applied. The fertilizer coating composition is applied so that it covers the entire surface of the fertilizer substrate, or at least a portion, or >5%, or >10%, or >20%, or >30%, or >40%, or >50%, or >60%, or >70%, of the surface.

Depending on the method of coating and the fertilizer substrate, the coating composition, including optional components, can be applied at ambient (for coating compositions consisting essentially of DCR as a liquid) or at a temperature range of up to 200° C. (for coating compositions comprising bitumen).

The thickness of the fertilizer coating depends on the application method and the fertilizer substrate, e.g., a coating of >8 µm, or >15 µm, or 10-50 µm, or <400 µm, or <200 µm.

Properties of Coated Fertilizer: The fertilizer coated with the coating composition herein is characterized as having reduced dust. In embodiments, the fertilizer coated with the coating composition is free-flowing, e.g., reduction in cake formation, and in embodiments has controlled/sustained release characteristics. It should be noted that the coating composition disclosed herein can be used for coating agricultural products other than fertilizer, e.g., seeds, animal feed, etc., and similar properties can be expected.

In embodiments, the coated fertilizer has a reduction of dust in a Dust Level Measurement Test (described below) of >75%, or >70%, or >60%, or >50%, or >40%, or >30%, or >25% after two (2) weeks, or four (4) weeks, or six (6) weeks of aging, compared to uncoated fertilizer.

In embodiments, the coated fertilizer is characterized as free-flowing for conical opening in a funnel flow test (according to ASTM D-6128-16 and Jenike Bulletin 123) of <10 ft, or a conical opening in a mass flow test of less than 3 ft. In embodiments, the composition is characterized as free flowing for conical hopper angle of <15 degrees from vertical.

The coated fertilizer requires <400 lbs/ft$^2$ or <300 lbs/ft$^2$ to break in a blocking test. In some embodiments, the coated fertilizer requires essentially no force to break in a blocking test.

Examples: The following illustrative examples are non-limiting.

The Components Used in the Examples Include:
Coating 1 is a commercially available canola oil.
Coating 2 is a naphthenic base oil with a viscosity of 18.65-21.85 cSt at 40° C., a flash point (COC) of ~166° C., a pour point of ~-42° C.
Coating 3 is a DCR material from Kraton Corporation, having the properties as shown in Table 1. Coating 3 also has the following: % O2 content of 0.39; % tricyclic compounds of 69.5, aromatic MW252 of 15.7; reactive double bond MW 254 of 0.1; aromatic MW256 of 40.3; reactive double bond MW 258 of 0.4; and cycloaliphatic MW260 of 0.7.
Coating 4 is a petroleum-based coating of 80% asphalt and 20% naphthenic distillates, with a melting point of ~150° F. and a viscosity of ~300 cps at 200° F.
Fertilizer 1 is a blend of monoammonium phosphate with ammonium sulfate and sulfur, having a pH of 4.2-505 in a 1 w/v %.
Fertilizer 2 is a phosphorus and nitrogen based monoammonium phosphate fertilizer.

TABLE 1

| Properties of Coating 3 | |
| --- | --- |
| Property | Coating 3 |
| Acid Number mg KOH/g | 7 |
| Viscosity, cSt @ 40° C. | 46.7 |
| Density, 40° C. | 0.95 |
| Sulfur (ppm) | 274 |
| Flash Point, COC | 140 |
| Aniline Point | 14 |
| Pour Point | −14 |

Fertilizer granules were placed inside a 24-inch diameter coating drum and allowed to roll, then heated to 60° C. (140° F.) prior to coating with coating samples. Coating 4 was heated to 90° C. (195° F.) before application. The coating samples were poured onto the fertilizer samples at an application rate of 0.2 wt. %. An additional 20% of the coating was calculated and added to each application rate to account for any coating that would remain in the beaker or stick to the drum. The samples were allowed to roll in drum for 5 minutes to ensure the coating spread evenly. After coating, the coated fertilizer was measured for dust levels. The samples were stored under conditions simulating dust levels normally encountered during the storage and/or transport of fertilizer, by storing the fertilizer samples alternately at 21° C. (70° F.) and in an oven at 60° C. (140° F.) for approximately 12 hours each, to simulate day and night storage inside a rail car.

Dust Level Measurement Test: In this test, a 100 g sample of the fertilizer as coated above was placed into an ACT 100 N fluidizing bed from Applied Chemical Technology and fluidized for 2 minutes at 250-300 sfpm to entrain dust particles 150 µm or smaller. The fertilizer sample is weighed and recorded. The amount of dust was calculated by the weight difference of the sample before and after the fluid bed. Dust level was determined both initially after treatment with the coating formulations and again after aging for up to six weeks. All samples were tested in triplicate.

| Mean Dust Levels (ppm) of uncoated and coated Fertilizer 1 | | | | | |
| --- | --- | --- | --- | --- | --- |
| No. | Sample | Week 0 | Week 2 | Week 4 | Week 6 |
| 1A | Uncoated | 151 | 321 | 684 | 937 |
| 1B | Coating 1 | 41 | 66 | 99 | 124 |
| 1C | Coating 2 | 39 | 69 | 106 | 144 |
| 1D | Coating 3 | 42 | 85 | 102 | 141 |
| 1E | Coating 4 | 48 | 72 | 107 | 144 |

| Mean Dust Levels (ppm) of uncoated and coated Fertilizer 2 | | | | | |
| --- | --- | --- | --- | --- | --- |
| No. | Sample | Week 0 | Week 2 | Week 4 | Week 6 |
| 2A | Uncoated | 133 | 194 | 330 | 606 |
| 2B | Coating 1 | 40 | 86 | 112 | 155 |
| 2C | Coating 2 | 42 | 85 | 109 | 137 |
| 2D | Coating 3 | 45 | 93 | 125 | 168 |
| 2E | Coating 4 | 49 | 84 | 122 | 149 |

Blocking Test Measurement: Is a test in which a block cylinder is filled with coated fertilizer samples to a length of ~2/3 to full. Weights of ~5.0 lbs are placed onto each fertilizer sample inside the block cylinder. The assembly is placed in an oven at 110° F. (43° C.). After 7 days, the cylinder is removed from the oven and weight is removed. Both top and bottom of the cylinder are removed, and the cylinder is opened at the side. Coated fertilizer is placed onto a test holder as a block for observation and further testing. Weight can be slowly added on top of the sample block until the sample block collapses into fertilizer granules. Some samples may crumble immediately into free-flowing fertilizer as they are removed from the cylinder and placed onto the test holder, some may crumble on the outside but can still be fused together in a core center requiring some force to break the fused core, and some stay as a block that would need force or weight to break the sample block into free-flowing fertilizer. Force to break (in blocking test) refers to the force in lbs/ft$^2$ required to break the sample block as placed onto the test holder. It is expected that the coated fertilizer substrate will have a force to break of less than 400 lb/ft$^2$.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A fertilizer composite comprising:
a fertilizer substrate, and
a coating disposed on at least a surface of the fertilizer substrate;
wherein the coating comprises:
2-100 wt. % decarboxylated rosin acid (DCR);
wherein the DCR has
a Kb value of 25-90, according to ASTM D1133,
an aniline point of 3-40° C., according to ASTM D611,
a viscosity of 15 to 60 cSt at 40° C., measured according to ASTM D-445, and
an acid value of <50 mg KOH/g, as measured using ASTM D1240-14 (2018);
0-98 wt. % bitumen; and
0-98 wt. % one or more components selected from the group of waxes, resins/polymers, plant oils, and mixtures thereof;
wherein the fertilizer composite has a reduction in dust level of >25%, measured according to Dust Level Measurement Test, after 2 weeks of aging compared to a fertilizer substrate not having the coating disposed thereon.

2. The fertilizer composite of claim 1, wherein the DCR comprises: one or more C═C groups; and 40 to 100 wt. % of tricyclic compounds having 18 to 20 carbon atoms.

3. The fertilizer composite of claim 2, wherein sum of tricyclic compounds as aromatic and cycloaliphatic in the DCR is >50 wt. %, based on total weight of the DCR.

4. The fertilizer composite of claim 2, wherein amount of the tricyclic cycloaliphatic compounds in the DCR is >15 wt. %, based on total weight of the DCR.

5. The fertilizer composite of claim 1, wherein the DCR has an acid value of less than 10 mg KOH/g.

6. The fertilizer composite of claim 1, wherein the DCR has at least one of:
an aniline point of 5-40° C., according to ASTM D611;
a pour point of −40 to +10° C., according to ASTM D97;
a flash point of 135-175° C., according to ASTM D92;
a boiling point of 200-390° C., according to D2887;
a Gardner Color of 0-12.0, according to ASTM D6166;
a sulfur content of <500 ppm, according to ASTM D5453;
a Kb (Kauri butanol) value of 30-85, according to ASTM D1133;
a viscosity index of ←100, according to ASTM D2270; and
a viscosity of 20-50 cSt, according to ASTM D-445 at 40° C.

7. The fertilizer composite of claim 1, wherein the bitumen is present in an amount of 5-95-wt. %, based on the total weight of the coating.

8. The fertilizer composite of claim 1, wherein the one or more components are present in an amount of 5-95-wt. %, based on total weight of the coating.

9. The fertilizer composite of claim 1, wherein weight ratio of the coating to the fertilizer substrate is greater than 0.1:1000.

10. The fertilizer composite of claim 1, wherein the fertilizer composite has a reduction in dust level of >50%, measured according to Dust Level Measurement Test, after 4 weeks of aging compared to a fertilizer substrate not having the coating disposed thereon.

11. A method of making a fertilizer composite, the method comprising:
providing a fertilizer substrate; and
coating at least a surface of the fertilizer substrate with a coating comprising:
2-100 wt. % decarboxylated rosin acid (DCR);
wherein the DCR has
a Kb value of 25-90, according to ASTM D1133,
an aniline point of 3-40° C., according to ASTM D611,
a viscosity of 15 to 60 cSt at 40° C., measured according to ASTM D-445, and
an acid value of <50 mg KOH/g, as measured using ASTM D1240-14 (2018);
0-98 wt. % bitumen; and
0-98 wt. % one or more components selected from the group of waxes, resins/polymers, plant oils, and mixtures thereof;
wherein the fertilizer composite has a reduction in dust level of >25%, measured according to Dust Level Measurement Test, after 2 weeks of aging compared to a fertilizer substrate not having the coating disposed thereon.

12. The method of claim 11, wherein the DCR comprises: one or more C═C groups; and 40 to 100 wt. % of tricyclic compounds having 18 to 20 carbon atoms.

13. The method of claim 12, wherein sum of tricyclic compounds as aromatic and cycloaliphatic in the DCR is >50 wt. %, based on total weight of the DCR.

14. The method of claim 12, wherein amount of the tricyclic cycloaliphatic compounds in the DCR is >15 wt. %, based on total weight of the DCR.

15. The method of claim 11, wherein the DCR has an acid value of less than 10 mg KOH/g.

16. The method claim 11, wherein the DCR has at least one of:

an aniline point of 5-40° C., according to ASTM D611;

a pour point of −40 to +10° C., according to ASTM D97;

a flash point of 135-175° C., according to ASTM D92;

a boiling point of 200-390° C., according to D2887;

a Gardner Color of 0-12.0, according to ASTM D6166;

a sulfur content of <500 ppm, according to ASTM D5453;

a Kb (Kauri butanol) value of 25-90, according to ASTM D1133;

a viscosity index of ←100, according to ASTM D2270; and a viscosity of 20-50 cSt, according to ASTM D-445 at 40° C.

17. The method of claim 11, wherein weight ratio of the coating to fertilizer substrate is greater than 0.1:1000.

\* \* \* \* \*